Aug. 9, 1949.   J. C. RAMSAUR   2,478,638
RAPID PICTURE CONVEYER

Filed Sept. 24, 1947   2 Sheets-Sheet 1

JOHN C. RAMSAUR
INVENTOR.

BY *J Stanley Burch*

ATTORNEY

Aug. 9, 1949.　　　　J. C. RAMSAUR　　　　2,478,638
RAPID PICTURE CONVEYER
Filed Sept. 24, 1947　　　　　　　　　　　　2 Sheets-Sheet 2
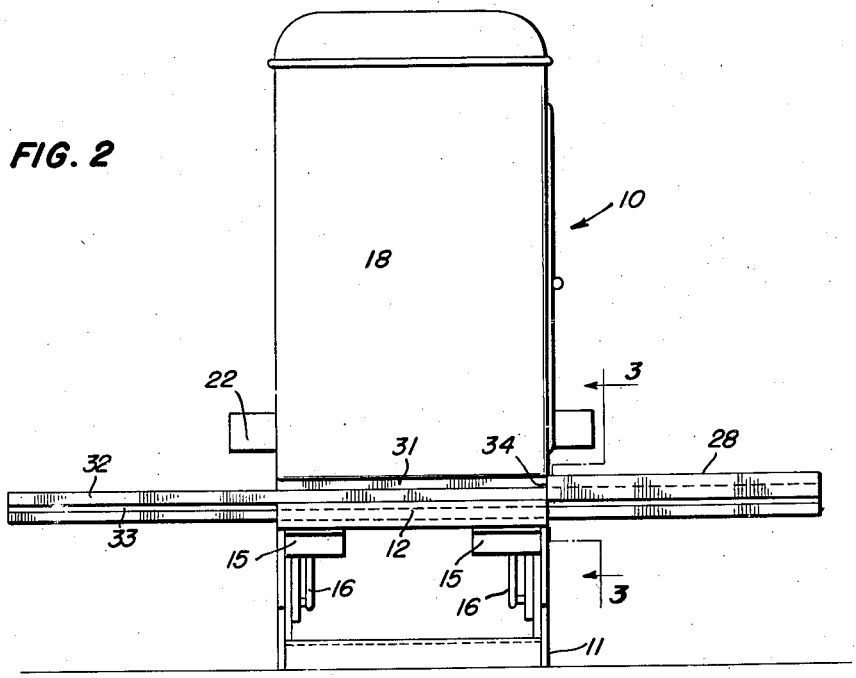
FIG. 2
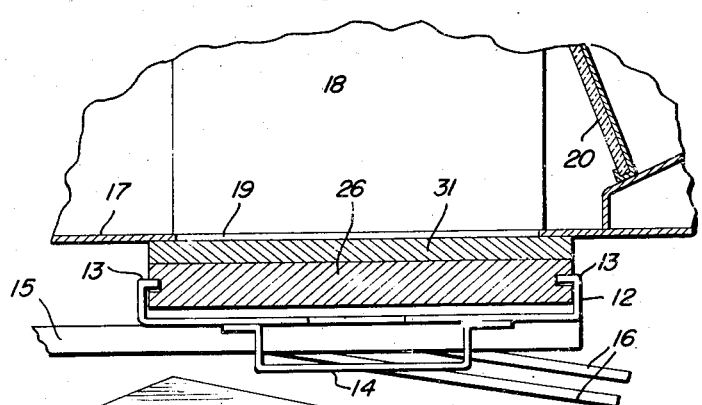
FIG. 3
FIG. 5
JOHN C. RAMSAUR
INVENTOR.
BY
ATTORNEY Patented Aug. 9, 1949

2,478,638

UNITED STATES PATENT OFFICE 2,478,638

RAPID PICTURE CONVEYER

John C. Ramsaur, Lincolnton, N. C.

Application September 24, 1947, Serial No. 775,792

2 Claims. (Cl. 88—28)

This invention relates to a rapid picture holder or conveyor for use in and as an attachment or adjunct in connection with a projector or projection apparatus for projecting onto a screen, images of opaque pictures or objects such as letters, writings or prints. Heretofore, difficulty has been experienced in properly positioning, guiding, holding, and centering such objects, especially opaque objects or pictures and it was usually necessary to place or slide same into the projector and adjust or center the same after being projected onto the screen in improper position thus producing an undesirable projection or effect and resulting in loss of time in the adjustment and centering or alignment of the picture on the screen.

The object of the present invention is to provide a novel and simple means in the form of a guide for the slides, objects, or pictures, especially when opaque, to properly guide the same into correct position at all times and which fits the picture holder of such projectors of various makes, models, and sizes of opaque projectors to enable the operator to accurately show the reflected pictures with speed and precision heretofore unknown, thus producing a better show and greater efficiency, as well as guiding the pictures or objects into proper position or entrance, stage, and discharge positions, and discharging displayed reflected pictures and objects automatically upon the insertion of a new picture for projection, thereby insuring accuracy and saving considerable time by avoiding the necessity for adjustment or centering after disposing the same in projecting position as formerly and permitting a larger number of opaque objects or object to be properly displayed in considerably less time with greater attractiveness.

These and other objects and advantages of the invention will become apparent from a consideration of the following detailed specification:

In the drawings:

Figure 2 is a rear elevation thereof.

Figure 3 is an enlarged fragmentary section taken on the line 3—3 of Fig. 2.

Figure 5 is a perspective view of a picture pad or base employed with the conveyor.

Figure 1:
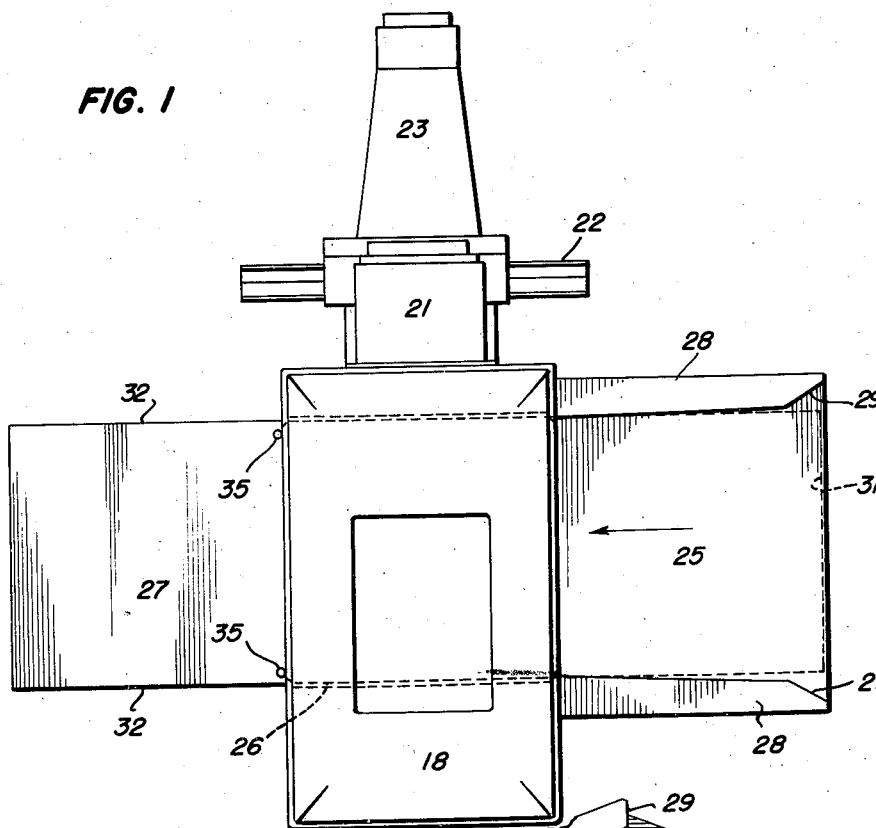
Figure 1 is a plan view of a projector with the invention applied.
Figure 4:
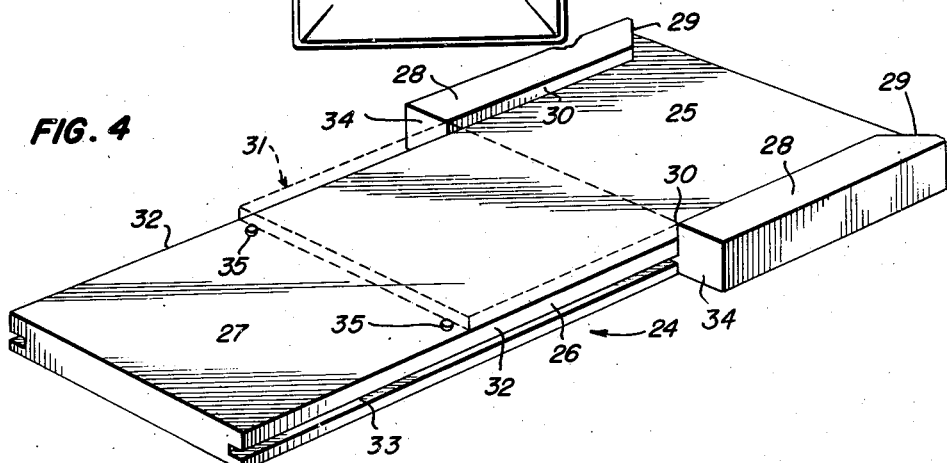
Figure 4 is a perspective view of the picture conveyor.

Referring to the drawings in detail, a projector 10 is shown having a base 11 with a picture or object holder 12 forming a channel, groove or guideway with inturned top flanges 13 and a handle bracket 14 to adjust the holder 12, and a rearward extension 15 forming an operating handle. The holder 12 is supported by two pairs of rods 16 pivoted thereto and to the base 11 to retain the holder parallel to the base, as in the patent to W. T. Perkins et al., No. 2,200,637, dated May 14, 1940, or otherwise. The base has side openings at the back for inserting the pictures or other opaque objects, above which is the bottom plate 17 of a lamp house 18, and has a picture opening or aperture 19 beneath which the pictures are supported for projection by the usual illuminating lamp or bulb (not shown) in the lamp house. The reflecting system includes a mirror or reflector 20 placed to project the picture images through an objective 21 having the usual lenses, and has a slide holder 22 for transparent or similar slides with an objective 23 as usual, including a lens mount.

The present invention is adapted for use with such types of projectors and to permit accurate and speedly display of opaque objects or pictures, writings, etc. which is not ordinarily possible with the holder 12, since the pictures are ordinarily placed therein and must be positioned by guesswork, and centered or adjusted to properly position the projected or reflected image on the screen after being projected or shown. In most instances, the pictures are out of position, the exact position being always uncertain, thereby producing an undesirable projection and resulting in loss of time in the adjustment. The present invention is designed for use with such projectors and fits the holder so as to properly position every picture, writing, or print in exact position instantly it is inserted and to permit instant change or inserting new pictures in succession or as fast as desired, and forms a flat surface to hold the picture, with portions forming an entrance picture support, a projection picture support and an exit picture support. It consists of a conveyor or holder 24 of flat elongated rectangular form or outline in plan divided into three flat sections of rectangular shape, consisting of an entrance portion 25, a stage 26 intermediately and an exit portion 27. The entrance portion 25 has longitudinal side guards or guides 28 having outwardly divergent beveled entrance ends 29 to facilitate the entrance of the picture between the inner edges 30 of the guides 28 on a soft rectangular flat pad or base 31 on which the pictures, writings, prints, or other opaque objects are first fastened if desired by thumb tacks or otherwise. The pad may be of beaver board or other soft material, but primarily is stiff and flat, and therefore any similar base may be employed. Thus, the entrance portion 25 is wider than long, by reason of the guides or side longitudinal raised portions or flanges 28 and the width between them is the same as the length of the entrance portion, the stage or intermediate portion 26 and the exit portion 27, while all three are of the same length and same width as the space between the guides 28. For example, they may be 7" x 7" or otherwise and the space between the guides or raised portions 28, also 7", but the full width of the entrance portion 25 including the laterally projecting guides 28 is greater than the width of the portions 26 and 27, such as 9" or otherwise.

The side longitudinal edges 32 of the holder or conveyor 24 is provided with longitudinal grooves or guideways 33 to slidably receive or engage the flanges 13 of the holder 12 until the inner ends 34 of the guides 28 engage the ends of the holder 12 to form stops or limiting means to position the entrance portion 25 outwardly thereof to receive the pad or base 31 thereon between the guides 28, with the picture or object fastened thereon or other object directly if desired. The stage or intermediate portion 26 is centralized beneath the picture aperture 19 and lamp house, and the exit section or portion 27 projects from the opposite side of the holder 12 and the bottom or base 11 and lamp house 18. Buttons or the like beveled raised members 35 may be provided to check the base or pad 31 with the picture or object thereon, or the object itself, to properly position the same for accurate instant centralized or exact projection when the image is reflected on the screen.

Thus, as the first picture is placed or guided into position on the entrance portion and pushed in with another or second of a plurality of bases or pads and pictures, or the picture or object itself, if sufficiently stiff or rigid and of the proper thickness to lie close to the picture aperture 19 of the bottom plate 17, the first picture is exactly positioned beneath the aperture for proper projection, no adjustment being necessary after being shown or reflected and projected onto the screen. By inserting another or third pad with a picture thereon, or the picture or object itself, in position on the entrance portion 25, the first one is caused to pass over the buttons or raised portions or members 35, which may be thumb tacks, and onto the exit or discharge portion 27 and the second pad and picture properly centralized in exact and proper position beneath the lamp house 18 and picture aperture 19. Insertion of a fourth pad and picture will move the others along to position the third one beneath the picture aperture for projection and the second one on the exit portion 27 outside laterally of the holder 12 and lamp house 18, while the first one is discharged, and caused to pile up with subsequent insertions.

Therefore, uncertain positioning of pictures or other opaque objects is obviated and rapid accurate projection accomplished. The device may be made of one or more plies or a single ply of proper material, metal, wood, or otherwise of fireproof material formed in any suitable way basicly as described, and of different sizes for different projectors, to show pictures with speed and precision.

The pad or base 31 is preferably black and may be calibrated and marked to insure correct placing of the picture thereon. The operator can quickly and accurately show pictures from magazines, calendars, books, etc., or other opaque objects.

What I claim as new is:

1. In combination with an optical projection apparatus adapted to project images of opaque pictures by reflected light rays and including a lamp house having a bottom picture opening and a channel shaped holder disposed transversely of and yieldingly elevated against the bottom of the lamp house at said opening, said holder having inturned top flanges, of a picture conveyor comprising an elongated plate having a narrow portion and a wider portion, said narrow portion having grooves in the side edges thereof slidably receiving the top flanges of the holder and affording a projection picture support at the picture opening and an exit picture support outside and at one side of the lamp house, said wider portion having its projecting side portions abutting an end of the holder and providing an entrance picture support outside and at the other side of the lamp house, said wider portion further having raised side flanges to guide pictures from the entrance support to the projection support.

2. In combination with an optical projection apparatus adapted to project images of opaque pictures by reflected light rays and including a lamp house having a bottom picture opening and a channel-shaped holder disposed transversely of and yieldingly elevated against the bottom of the lamp house at said opening, said holder having inturned top flanges, of a picture conveyor comprising an elongated plate having a narrow portion and a wider portion, said narrow portion having grooves in the side edges thereof slidably receiving the top flanges of the holder and affording a projection picture support at the picture opening and an exit picture support outside and at one side of the lamp house, said wider portion having its projecting side portions abutting an end of the holder and providing an entrance picture support outside and at the other side of the lamp house, said wider portion further having raised side flanges to guide picture from the entrance support to the projection support, and a rectangular slide movable on the conveyor including a plate-like pad on which a picture may be fastened by thumb tacks or the like, said slide being of a surface area substantially equal to that of each picture support and guidable between the raised side flanges.

JOHN C. RAMSAUR.

REFERENCES CITED

The following references are of record in the file of this patent:

UNITED STATES PATENTS

| Number | Name | Date |
|---|---|---|
| 346,994 | Gray et al. | Aug. 10, 1886 |
| 1,341,665 | Ott et al. | June 1, 1920 |
| 1,485,147 | Patterson | Feb. 26, 1924 |
| 1,831,766 | Hanks | Nov. 10, 1931 |
| 2,200,637 | Perkins et al. | May 14, 1940 |

FOREIGN PATENTS

| Number | Country | Date |
|---|---|---|
| 500,945 | Germany | June 28, 1930 |